March 8, 1932.  F. M. CARROLL  1,848,106
KEY ADDING DEVICE FOR TABULATING MACHINES
Filed Nov. 23, 1926   4 Sheets-Sheet 1

Inventor
FRED M. CARROLL
By his Attorney
W. M. Wilson

March 8, 1932.   F. M. CARROLL   1,848,106
KEY ADDING DEVICE FOR TABULATING MACHINES
Filed Nov. 23, 1926    4 Sheets-Sheet 2
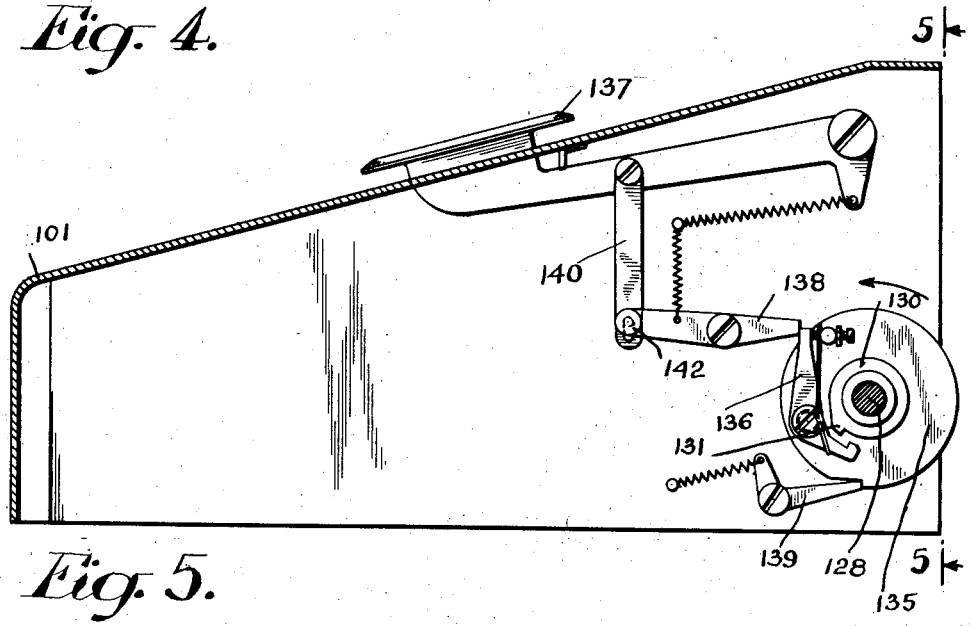
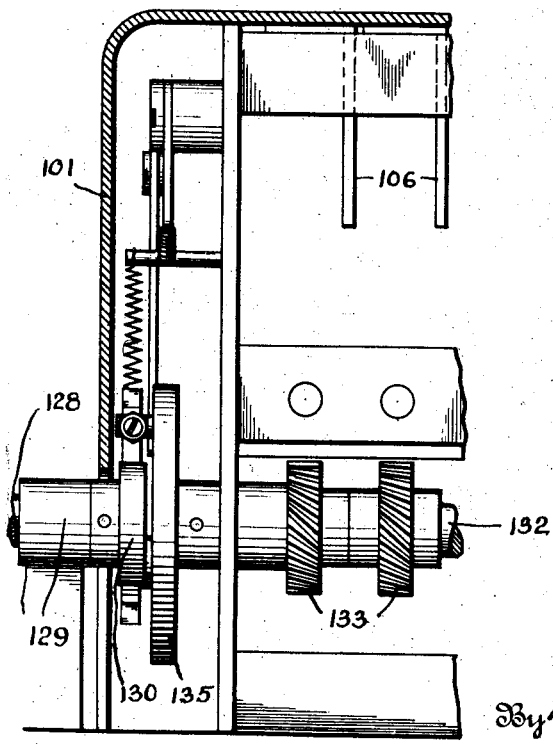
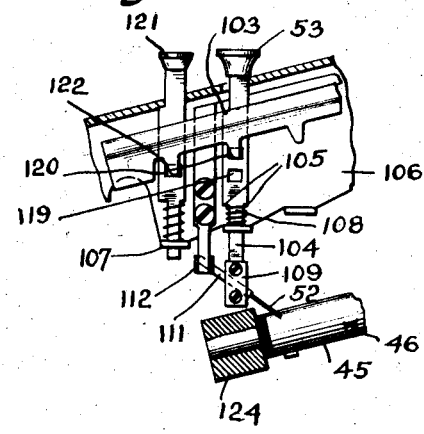
Inventor
FRED M. CARROLL
By his Attorney
W. M. Wilson

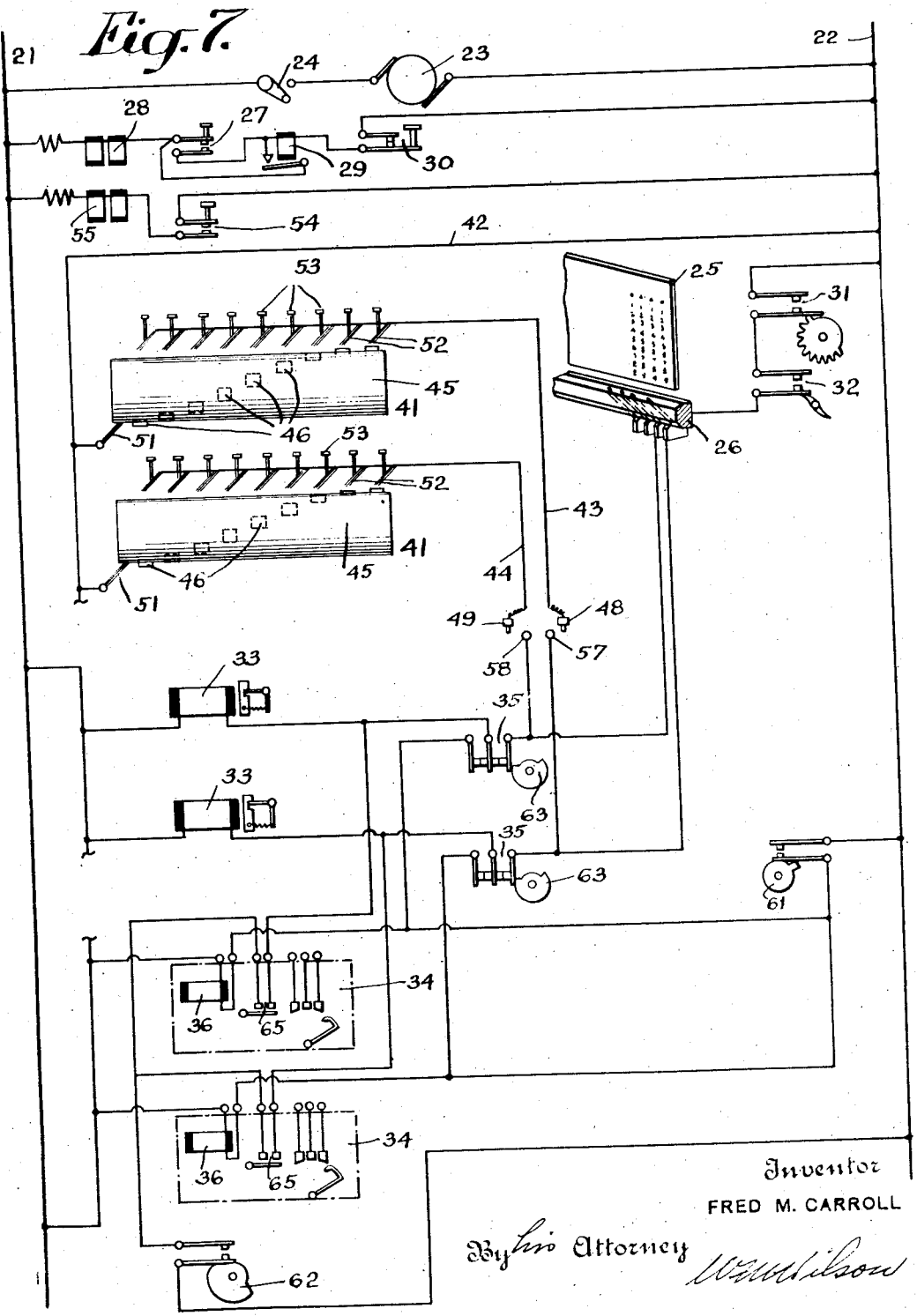

March 8, 1932.   F. M. CARROLL   1,848,106
KEY ADDING DEVICE FOR TABULATING MACHINES
Filed Nov. 23, 1926   4 Sheets-Sheet 4
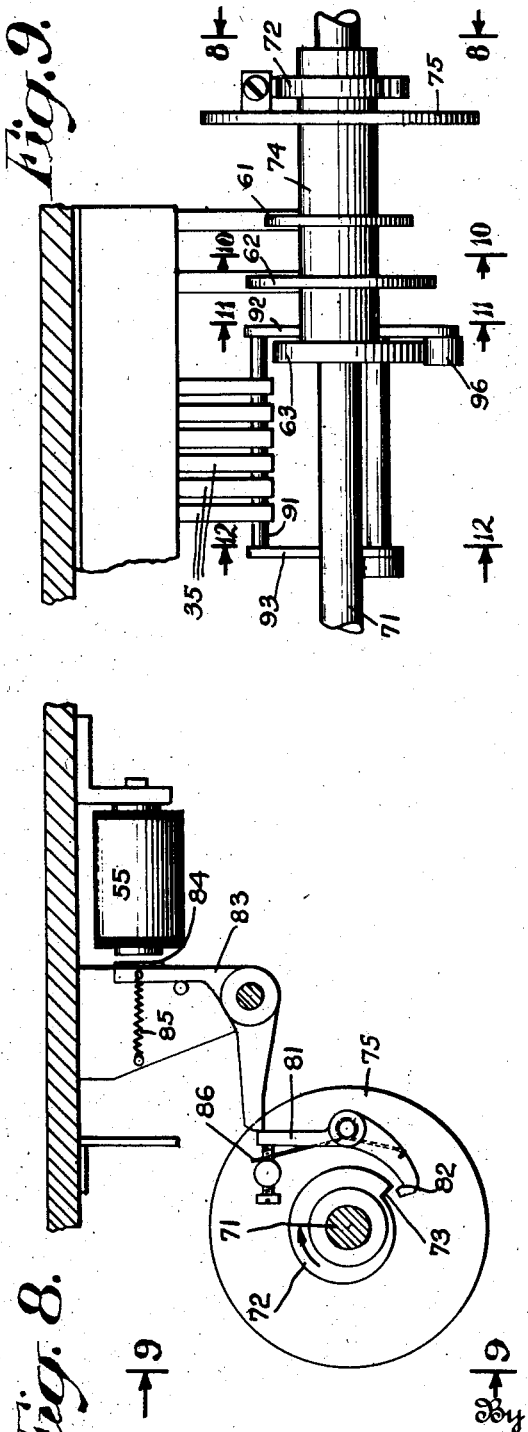
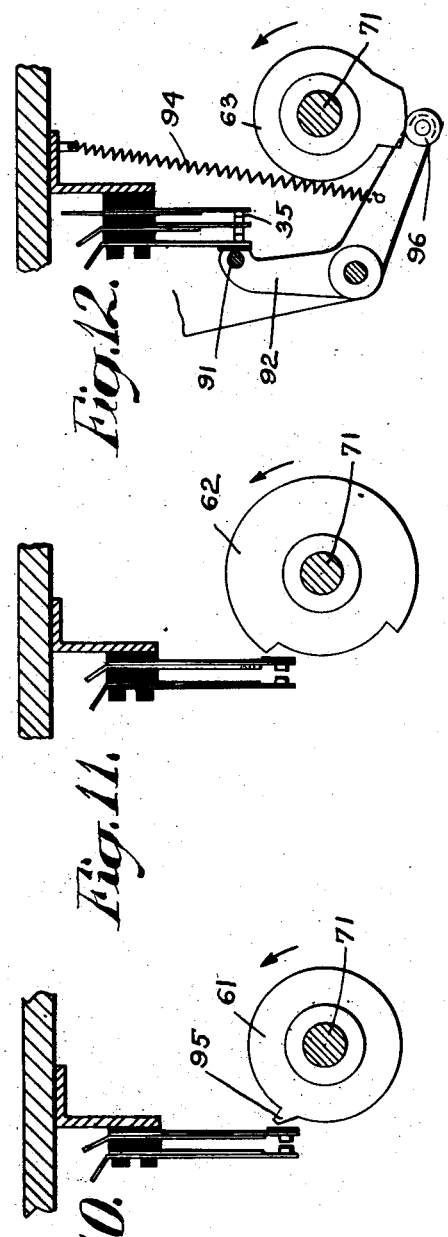
Inventor
FRED M. CARROLL
By his Attorney Patented Mar. 8, 1932

1,848,106

UNITED STATES PATENT OFFICE

FRED M. CARROLL, OF YONKERS, NEW YORK, ASSIGNOR TO THE TABULATING MACHINE COMPANY, OF ENDICOTT, NEW YORK, A CORPORATION OF NEW JERSEY

KEY ADDING DEVICE FOR TABULATING MACHINES

Application filed November 23, 1926. Serial No. 150,248.

This invention concerns accounting machines of the tabulator type and has for its principal object to extend and improve the operation thereof particularly with a view to imparting new functions to such machines in addition to the functions ordinarily found therein.

A more specific object of the invention is to provide for manually entering items into the accumulating and printing devices of such machines.

A further object of the invention is to provide for entering items in such machines from a manual set up independently of the analyzing mechanism.

Still another object of the invention is to provide for entering items in such machines from a manual set up by converting the set up into a timed operation in synchronism with the normal machine operation.

Still another object of the invention is to provide for manually setting keys corresponding to index point positions on controlling records and controlling the accumulating and printing mechanism thereby from timed operations automatically selected by the key set up.

Still another object of the invention is to provide for manually entering items into the accumulating and printing devices of an electrically controlled tabulator by manually setting up key controlled circuit closers corresponding to the index point positions of controlling records and energizing the selected circuits at points in the cycle of machine operation corresponding to the normal time of analyzing the corresponding index point.

Tabulating machines are designed to analyze data recorded on record cards and automatically enter the data into accumulating devices for adding and if desired into printing devices for listing. The data are usually represented by perforations in the cards and are identified by the differential locations of the perforations. The cards are fed automatically to an analyzing device which controls the operation of the accumulators and printers in accordance with the differential locations of the perforations. The accumulators and printers are operated by cyclically moving parts of the machine operated in synchronism with the card feed and their operation is initiated at a time in the cycle corresponding to the location of the designating perforations. The commonest type of tabulator has an analyzing mechanism consisting of brushes past which the record cards are fed, the cards being in continuous motion while being analyzed. When a brush encounters a perforation it causes a pulse of current through the printing and accumulating control circuits timed according to the differential locations of the perforatons and as the operation of the accumulators and printers is synchronous with the card feed, this timed pulse of current will automatically cause these devices to register the data represented by the differentially located perforations.

The present invention provides for manually controlling the entry of items into the accumulators and printers in addition to the automatic entry from the card records. The record cards are punched prior to the tabulating operation and therefore represent fixed data which can only be changed by repunching the card or discarding it and punching a new one. It is often desirable, however, to enter data of a more temporary nature which would scarcely justify the labor and expense of punching a card in order to enter it into the machine. This would occur, for example, if it were desired to add additional items from cards to a sub-total which had been previously obtained. According to the invention data of this temporary nature may be entered from a keyboard from which it may be erased as soon as it has been entered into the machine. In the preferred form of the device a keyboard is provided for setting control mechanism of the accumulators and printers which will be rendered effective at a point in the machine cycle corresponding to the data which the key represents. For example, if it is desired to enter a "5" in the accumulators, the "5" key is depressed at the beginning of the cycle but owing to the synchronous operation of the machine the operation of the controlling devices for actually initiating the entry of the "5" must be delayed until some point near the middle of the cycle to correspond to a similar entry from a record card. The "5" key then will merely set the control devices and a member operating synchronously with the card feed will operate them at a point in the cycle corresponding to the passage of a "5" index point perforation on a record card past the analyzing brushes.

The invention is illustrated by way of example in the accompanying drawings in which the same reference numerals designate the same parts throughout the several views and in which Fig. 1 is a longitudinal section through the key operated entering device;

Fig. 4 is a longitudinal section of the device illustrating the operating mechanism;

Fig. 5 is a detail section along the line 5—5 of Fig. 4;

Fig. 6 is a detail illustrating the operation of the keys;

Fig. 7 is a diagram of the machine circuits and

Figs. 8 to 12 are details of a total printing control mechanism for the tabulator.

Figure 1:
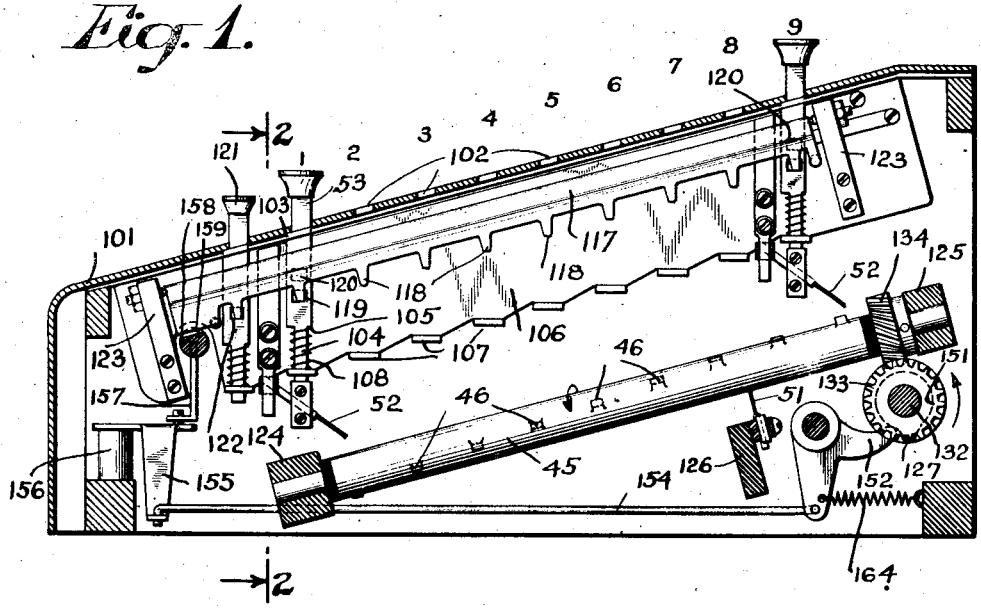
Figure 2:
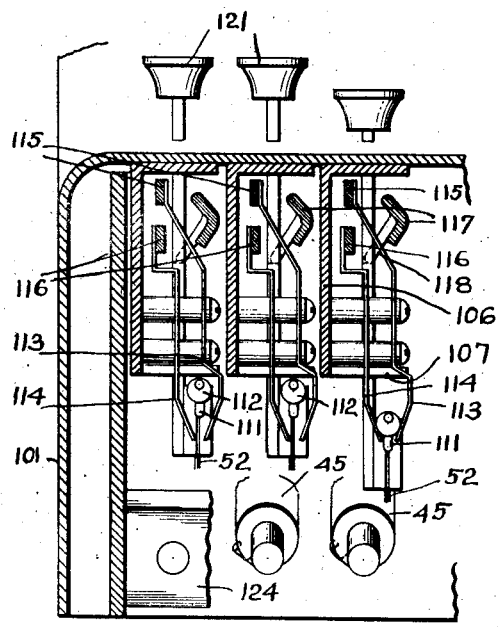
Fig. 2 is a fragmentary lateral section along the line 2—2 of Fig. 1.
Figure 3:
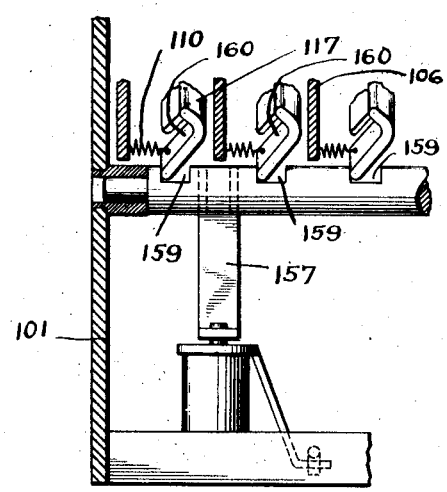
Fig. 3 is a detail illustrating the key releasing mechanism.

The general operation of the machine may be best understood from Fig. 7 in which the lines 21 and 22 indicate a source of electric power for energizing all of its circuits. The mechanical parts of the machine are driven by an electric motor 23 controlled by a switch 24. A group of record cards is indicated at 25 adapted to be fed to analyzing mechanism 26 for analysis thereby. The operation of the motor 23 does not in itself institute card feed as this is controlled by a one revolution clutch well known in the art. Card feed may be initiated by momentarily closing the start key 27 thereby energizing the card feed clutch magnet 28 through a circuit extending in series through a holding relay 29 and stop key contacts 30 normally closed. The energization of the relay 29 closes a stick circuit for itself comprising a shunt around the start key contacts 27. Card feed magnet 28 therefore remains energized even if the start key contacts are opened until its circuit is interrupted by the opening of the stop key contacts 30. Energization of the magnet 28 operates a clutch and causes card feed to continue as long as this magnet is energized. The brushes of the analyzing device 26 are energized through a circuit including cam operated contacts 31 and card lever contacts 32. The latter are closed by a suitable card operated lever only when a record card is under the brushes, thus preventing energization of the analyzing brushes when no card is under them.

The contacts 31 are controlled by a dentated cam which closes them instantaneously for each index point which might be encountered on a record card. This dentated cam is so designed that the pulse of energy occurs after the analyzing brush has reached a perforation and is interrupted before the brush clears the perforation thus preventing sparking at the analyzing brushes. The analyzing brushes control the circuits of the printer control magnets 33 and the counter magnets of the analyzing device 34 the circuits including double contacts 35. The operation of these devices is fully explained in my copending application, Ser. No. 147,960 filed November 12, 1926, now Patent No. 1,750,459, granted Mar. 11, 1930, and need not be described in detail herein.

The devices for entering items by key or manual operation are indicated generally at 41 and control a circuit in parallel to the analyzing brush circuit extending through wires 42 and 43 or 44. The wires 43 and 44 terminate in plugs 48 and 49 which may be inserted in any of the sockets 57, 58 to permit the devices 41 to be wired in parallel with any analyzing brushes. These circuits as well as the brush analyzing circuits include the contacts 35 so that whenever necessary both the brushes and key contacts may be removed from operative relationship with the printers 33 and the accumulators 34. The key operated device 41 consists of a conducting cylinder 45 upon which are spirally arranged a group of spaced projections 46. The cylinder 45 is driven synchronously with the card feed by the motor 23 and the projections 46 are so spaced that each will come into cooperative relationship with a key operated contact 52 at a point in the cycle corresponding to the particular data which its key represents which point corresponds to the point at which the analyzing brushes would encounter a card perforation representing the same data. The cylinder 45 is energized through a brush 51 connected to the wire 42. The contacts 52 are normally held out of the path of the projections 46 but may be projected into their paths by the operating key 53 and when so positioned will remain in the path of travel until the end of the machine cycle. This mechanism will be described in detail hereinafter. The depression of a key 53 then projects its corresponding contact 52 in position to be engaged by one of projections 46 on the cylinder 45. At the proper time in the machine cycle the rotating cylinder will cause a projection to engage the selected contact and close the controlling circuits of the printing and accumulating devices, the timing and operation of these devices under this manual operation being exactly similar to that initiated directly from the record cards.

A total of the items entered into the accumulators 34 may be printed by closing the total key 54 to energize the total printing control magnet 55. This magnet through a one revolution clutch causes the cams 61, 62 and 63 to rotate for one revolution. The cam 61 at the beginning of the total printing cycle instantaneously closes its contacts to energize all the counter magnets 36 of the accumulator units. As each adder element of these units reaches zero it closes its total printing contacts 65 and through a circuit extending through the contacts of cam 62 and the total control contacts 65 energizes its corresponding printer magnet 33. This operation of the accumulators in controlling total printing is synchronized with the driving of the printing mechanism so that as an accumulator element reaches zero the printing type representing the data originally standing on the unit will be passing printing position and will be selected for printing by the corresponding control magnet 63. During this total printing cycle the contacts 35 are opened by the cam 63 to disconnect the analyzing device 26 and the manual entering device 41 from the accumulator and printing magnets.

The operation of the total printing cams is illustrated in Figs. 8 to 12 in which a shaft is shown at 71 which is constantly rotated by the motor 23 (shown in Fig. 7) as long as the latter is in operation. Fixed to this shaft to rotate with it is a disc 72 provided with a notch 73. Loosely mounted on the shaft is a sleeve 74 permitting free rotation of the shaft without normally rotating the sleeve. Fixed to the sleeve are the cams 61, 62 and 63 and an additional disc 75 which carries a pivoted dog 81 overlying the disc 72 and provided with an end portion 82 adapted to engage the notch 73. The dog is biased by a spring 86 to force its end 82 into the notch 73 but is normally prevented from doing so by a pivoted two arm lever 83 carrying on one arm the armature 84 of total printing control magnet 55. The other arm of the lever 83 normally engages the dog 81 and prevents its end 82 from engaging the notch 73. The lever 83 is biased to latching position by a spring 85. When the printing control magnet 55 is energized it attracts its armature 84 and rocks the lever 83 out of latching position permitting the end of the dog 81 to engage in the notch 73 and causing the disc 75 and the sleeve 74 with its attached cams to rotate with the shaft 71. The energization of the magnet 55 is instantaneous and its armature is immediately released whereupon the lever 83 swings back into latching position and at the end of a single revolution of the disc 75 causes disengagement of the dog 81 from disc 72 and permits the sleeve 74 to come to rest with its cams 61, 62, 63 and disc 75 in their normal positions. The cam 61 is shown in Fig. 10 and has a single narrow cam projection 95 which closes the cooperating contacts for an instant at the beginning of the printing cycle. The resiliency of the contacts causes them to open as soon as they are released from the action of the projection 95 and this momentary closing furnishes the actuating impulse for the counter magnets of the accumulating units as explained above. The cam 62, shown in Fig. 11, operates similarly to cam 61 but causes its corresponding contacts to close during the greater part of the printing cycle. The contacts 35 are controlled by a cam 63 as illustrated in Figs. 9 and 12 and these contacts are normally closed and remain closed until the beginning of a total printing cycle when they are opened and remain open until the end of the cycle and then close again. The contacts 35 are normally held closed by a bail 91 carried on pivoted levers 92 and 93 of which 92 carries a cam follower 96 cooperating with the cam surface of 63. A spring 94 constantly biases the lever 92 for rotation to remove the bail 91 from engagement with the contacts 35 and permit the latter to open through their own resiliency. This action is prevented until the beginning of the total printing cycle by the high portion of the cam 63 which engages the follower 96 and holds the bail 91 against the contacts 35 counteracting the force of spring 94. Shortly after the beginning of a totaling cycle the cam follower 96 drops to the low portion of the cam surface and permits the spring 94 to rock the levers 92 and 93 and remove the bail 91 from engagement with the contacts 35. The latter remain open until towards the end of the total printing cycle when the follower 96 again rides to the high portion of the cam surface and rocks the lever 92 causing the bail 91 to again close the contacts 35.

The key operated controlling device is illustrated in Figs. 1 to 6, inclusive, and is housed in a casing 101 having a slanting upper surface conforming to the usual shape of commercial accounting machines. The upper side of the casing 101 is provided with a plurality of slots 102 to accommodate the shanks of the operating keys 53. One complete row of keys must be provided for each accumulator which is to be manually controlled but as it is not usually necessary to manually control on every accumulator in the machine simultaneously the number of rows may be fewer in number than the accumulators and desired accumulators be selected for manual control by the plugging system explained in connection with Fig. 7. Each key is substantially a duplicate of any of the others although all have certain common controlling and locking elements. The shank of each key 53 (see Fig. 6) consists of a flat metal bar reduced laterally at its upper portion to form a shoulder 103 which when the key is in its uppermost position engages the under side of the top of the casing and normally prevents removal of the key. The shank at its lower portion has a reduced extension 104 forming two shoulders 105. The keys are supported by a vertical plate 106 provided with a plurality of horizontal extending shelves 107 slotted to permit the reduced portions 104 to slide therethrough. Compression springs 108 surround the reduced portions 104 and are seated on the shelves 107 and the shoulders 105 to normally hold the keys in their uppermost positions. The flexible contacts 52 are mounted in a rigid conducting bar 111 provided with an enlarged contacting section 112 at its end opposite the contacts 52 (see Figs. 2 and 6). The bar 111 is clamped to the shank of the key 53 between two insulating blocks 109. The contacting portion 112, reciprocates between two resilient contacts 113 and 114 electrically connected to bus bars 115 and 116, respectively, which extend throughout the length of the casing and energize all the resilient contacts in a given row. The lower ends of the contacts 113 and 114 are bent to approach each other so that while the key is in its upper position the contactor 112 will be free from engagement with these contacts but in lowered position of the key it will engage them, springing the resilient contacts to provide a firm contact. The bus bars 115 and 116 are energized at the same potential, the duplication serving to insure positive energization of the brush 52 whenever its key is depressed. When a key is depressed it is necessary to hold it down for a period as the depression of the key does not in itself close a control circuit but merely sets the circuit for energization at the proper point in the cycle. A common locking bar 117 provided with a locking projection 118 for each key in the row is pivoted between brackets 123 at opposite ends of the machine casing and the projections 118 are held against the shanks of the keys by springs 110 (shown in Fig. 3). Each operating key numbered from 1 to 9, inclusive, in Fig. 1, is provided with two slots or depressions 119 and 120 in the former of which a projection 118 rests when the key is in raised position and in the latter of which the projection seats when the key is in lowered position. In the latter case the cooperation of this projection with the slot will hold the key down against the action of its compression spring 108 until the locking plate 117 is rocked to remove the projection from the slot. It is ordinarily desirable to have only one key in a row depressed and if a second one is depressed this locking mechanism will automatically release the first one and hold the second one down. On the depression of the second key the projection 118 will be cammed out of the slot 119 by the side of the slot thus rocking the locking plate 117 temporarily out of locking position and releasing any key which may have been previously depressed. When the key is totally depressed a projection 118 will engage its slot 120 and hold it down. The lowermost key of the row, shown at 121 in Fig. 1, is an erasing key to release any key in the row which might have been depressed through error and which it is desired to release without depressing another counting key. The key 121 is substantially similar to the keys 53 except that it carries no contact and is provided with a single notch 122 in which a projection 118 on the locking plate engages when the key is in raised position. Depressing the key 121 will cam this projection out of the slot 122 and cause rocking of the plate 117 to release any key in the row which might be depressed.

The shafts 45 of which one is provided for each row of keys serve to close the accumulator circuits at the proper time in the cycle owing to the co-action between the spirally arranged projections 46 and the brush contacts 52. The control circuit for each shaft 45 is completed through a brush 51 mounted on a conducting plate 126 which extends substantially the entire width of the casing and on which are mounted corresponding brushes for each shaft 45. The shafts 45 are journalled in common plates 124 and 125 and are normally stationary but may be rotated through a single revolution by a mechanism which will now be described.

A common drive shaft 128 is provided for all the shafts 45 and terminates just within the casing 101 as shown in Fig. 5. Rigidly fixed to this shaft at its end is a sleeve 129 carrying a disc 130 having a projection on its surface to form a notch 131 (as shown in Fig. 4). Within the casing 101 in alignment with the drive shaft 128 but disconnected therefrom is a shaft 132 on which are fixed suitable gears 133 meshing with gears 134 on the several shafts 45. The shaft 132 at its end adjacent to drive shaft 128 carries a disc 135. The discs 130 and 135 form the elements of a one revolution clutch similar to that described above, a dog 136 being pivoted on the disc 135 to engage the clutch element when desired but normally held out of engaging position by a latch 138. The operation of the clutch in the present case, however, is initiated by an operating key 137 connected to the latch 138 by a link 140, a slot connection being provided at 142 to prevent undesirable interference between the operating key and the latch after a clutching action has been initiated. A momentary depression of the operating key 137 releases the dog 136 which thereupon engages the notch 131 and causes the shaft 132 to turn one revolution at the end of which the dog is again latched by the latch lever 138, the shaft 132 coming to rest in its normal home position. Reverse movement of the disc 135 and the shaft 132 on reaching home position is prevented by a latch 139 pressed by a spring into a notch in the disc. The engagement of the one revolution clutch then will cause the shaft 45 to rotate for a single revolution and properly energize the control circuits of the accumulators and printers as explained above in connection with Fig. 7.

At the end of this single revolution all the keys which were depressed must be restored to their normal inoperative position as otherwise undesirable adding and printing might occur in the later machine cycles. The releasing mechanism is operated by a cam 151 shown in Fig. 1 and mounted on the shaft 132 and whose surface is provided with a hump 127 adapted to engage and rock a bell crank 152 against the action of its spring 164. The bell crank is connected by a rod 154 to a member 155 integral with a pivoted supporting pedestal 156. The pivot point between the rod 154 and member 155 is offset from the pedestal 156 so that the movement of the rod 154 to the left in Fig. 1 in response to the rocking of the bell crank 152 causes a slight rotation of the pedestal and member 155. Supported on the member 155 is an arm 157 shown in Figs. 1 and 3 fastened to a shifting rod 158. The rod 158 is provided with notches 159 in a different one of which each projection 160 on the several rocking bars 117 extends. The movement of the member 155 causes the shifting rod 158 to shift to the right from its position shown in Fig. 3 and the sides of the notches 159 rock each locking bar 117 against the action of its spring 110 and thus releases any key which might be depressed. At the end of the cycle the hump 127 clears the arm of bell crank 152 and allows it to return to normal position under action of the spring 164 whereupon the shifting bar 158 is returned to its normal rest position shown in Fig. 3. The width of the slots 159 is sufficient to permit free rocking of the bars 117 to locking and unlocking position under the action of the keys. At the end of the single cycle then the one revolution clutch will disengage and permit all parts of the mechanism to come to rest in normal inoperative position.

The invention has been explained in connection with a single operative example but it will be understood that many modifications of the structure will readily occur to those skilled in the art and the invention may be applied to a mechanically controlled machine as well as to an electrical one. I intend to be limited, therefore, only as indicated by the scope of the following claims.

I claim:

1. In a tabulator which includes accounting devices and cyclically operable means for entering items therein from controlling records, a manually controlled entering mechanism comprising manipulable devices for setting up data to be entered, means operable synchronously with the cyclically operable entering means of the tabulator for entering items from a manual set up, means for manually selecting at will isolated cycles of operation for the record controlled entering means and means automatically effective upon the passage of records for causing the accounting device to be controlled by the records.

2. In a tabulator which includes accounting devices and cyclically operable means for entering items therein from controlling records, a manually controlled entering mechanism comprising key operated devices for effecting desired set-ups of items, means operable synchronously with the record controlled entering means for entering items corresponding to said set-ups into the accounting devices and means for initiating the operation of said last named means at the beginning of any machine cycle during continuous machine operation.

3. In a tabulator which includes accounting devices and cyclically operable means for entering items therein from controlling records, a manually controlled entering mechanism comprising key operated devices for effecting desired set-ups of items, a continuously operating driving mechanism, means driven by said mechanism in synchronism with the record controlled entering mechanism but normally disconnected therefrom for entering items corresponding to said set-ups into said accounting devices and means for selectively effecting driving engagement between said driving mechanism and said driven means to operate the latter during any desired machine cycle.

4. In a tabulator which includes accounting devices and cyclically operable means for entering items therein from controlling records, a manually controlled entering mechanism comprising key operated means for setting-up items, a constantly rotating shaft, an element synchronously operable with the entering means of the tabulator for entering items corresponding to said set-ups into the accounting devices, a one revolution clutch for effecting driving connection between said shaft and said element and manually operable means for controlling said clutch for initiating operation of said element at the beginning of any machine cycle.

5. An accounting machine comprising an electrically operated accounting device, manually controlled means for entering items therein comprising a group of keys, a shaft having a group of spirally arranged contacts thereon, a coacting contact for each of said first named contacts severally movable in the path thereof by the keys and control circuits for said accounting devices controlled by said contacts.

6. An accounting machine comprising an electrically operated accounting device, manually controlled means for entering items therein comprising a group of keys, a shaft having a group of spirally arranged contacts thereon, a coacting contact for each of said first named contacts and each mounted on one of said keys for movement into the path of said first named contacts by key actuation and control circuits for said accounting devices controlled by said contacts.

7. An accounting machine comprising a plurality of electrically operated accounting elements, manually controlled means for entering items therein comprising a group of keys for each accounting element, a shaft having a plurality of spirally arranged contacts thereon, one for each group of keys, a contact for each key movable thereby into the path of the corresponding spirally arranged contact for wiping engagement therewith during uninterrupted motion of the shaft and a control circuit for each accounting device controlled by said contacts.

8. An accounting machine comprising a plurality of electrically operated accounting elements, manually controlled means for entering items therein, comprising a group of keys for each accounting element, a shaft having a plurality of spirally arranged contacts thereon, one for each group of keys, a shank on each key having a contact mounted thereon movable by operation of the key into the path of the corresponding spirally arranged contacts for wiping engagement therewith during uninterrupted motion of the shaft and a control circuit for each accounting element controlled by said contacts.

In testimony whereof I hereto affix my signature.

FRED M. CARROLL.